Figure 1:
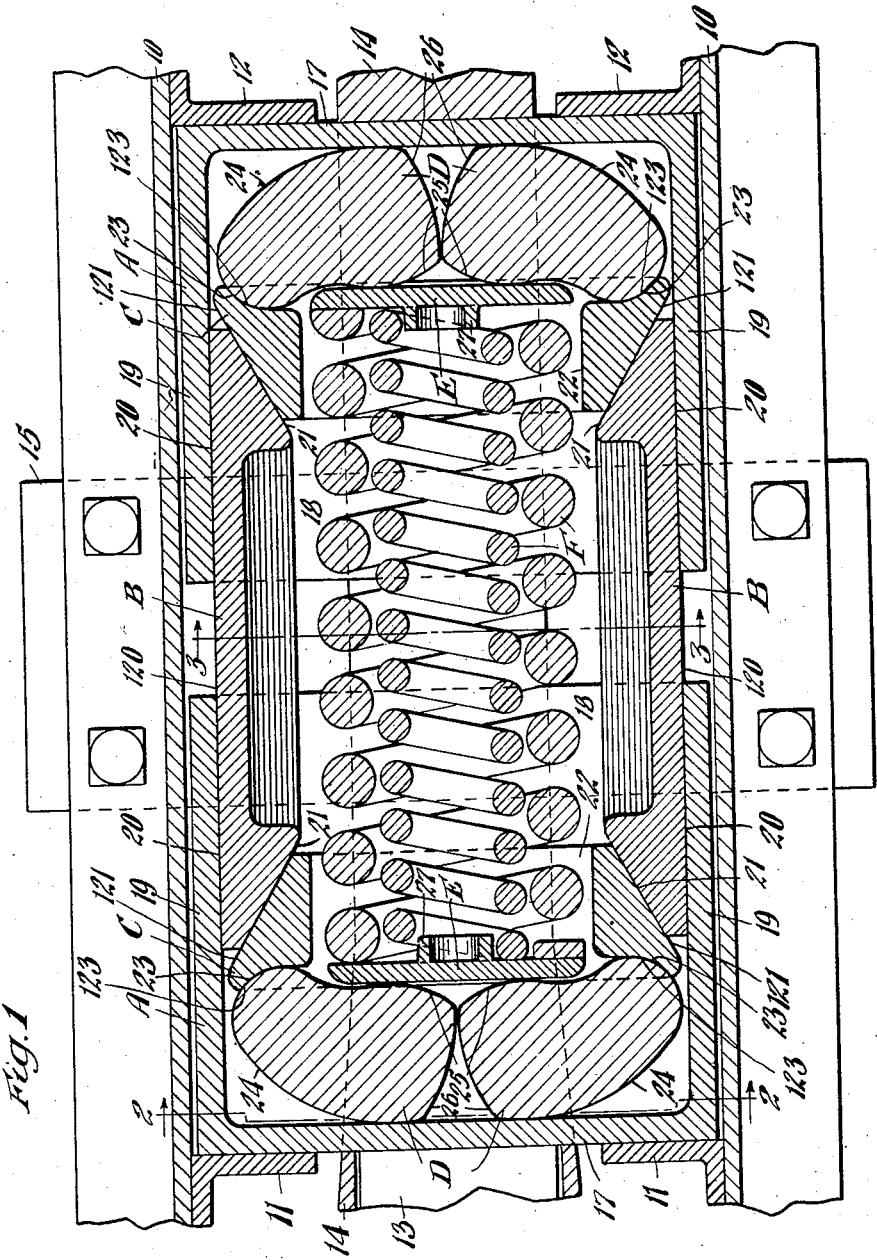

Jan. 4, 1927.

G. B. DOREY 1,612,803

FRICTION SHOCK ABSORBING MECHANISM

Filed Feb. 28, 1925    2 Sheets-Sheet 1

Witnesses

Wm. Geiger

Inventor
George B. Dorey
By George I. Haight
His Atty.

Jan. 4, 1927.  1,612,803
G. B. DOREY
FRICTION SHOCK ABSORBING MECHANISM
Filed Feb. 28, 1925  2 Sheets-Sheet 2
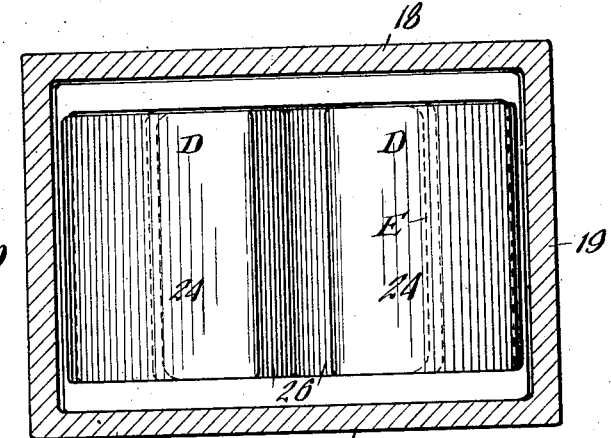
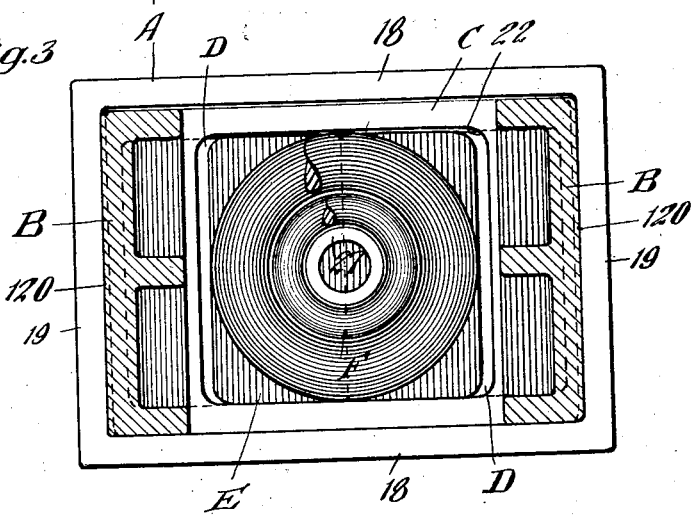
Witnesses
Wm. Geiger
Inventor
George B. Dorey
By George D. Haight
His Atty.

Patented Jan. 4, 1927.

1,612,803

UNITED STATES PATENT OFFICE.

GEORGE B. DOREY, OF EVANSTON, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 28, 1925. Serial No. 12,207.

This invention relates to friction shock absorbing mechanisms.

One object of the invention is to provide a friction shock absorbing mechanism especially designed for railway draft riggings, wherein is provided high capacity, together with assured release.

Another object of the invention is to provide a mechanism of the character indicated, including a plurality of relatively movable friction elements, together with means for forcing the friction elements into intimate contact, said means including a plurality of spring resisted rocking members.

Still another object of the invention is to provide a friction shock absorbing mechanism of simple construction, wherein a toggle action of certain of the pressure transmitting elements is utilized to effect a greater spring compression than the actual travel of the actuating elements.

A still further and more specific object of the invention is to provide a shock absorbing mechanism, including front and rear follower acting members relatively movable toward each other and having longitudinally disposed friction surfaces with which friction elements cooperate, the friction elements being forced into intimate contact with the friction surfaces of the followers by a plurality of rockers and coacting wedge members.

Other objects and advantages of the invention will more clearly and fully appear from the description and claims hereinafter following.

In the drawings, forming a part of the specification, Figure 1 is a horizontal, longitudinal, sectional view of a portion of a railway draft rigging, showing my improvements in connection therewith. And Figures 2 and 3 are vertical, transverse, sectional views corresponding, respectively, to the lines 2—2 and 3—3 of Figure 1.

In said drawings, 10—10 indicate channel-shaped center or draft sills, to the inner surfaces of which are secured front stop lugs 11—11 and rear stop lugs 12—12. The inner end portion of the drawbar is indicated at 13, to which is operatively connected a hooded yoke 14 of well-known form. The shock absorbing mechanism is operatively supported within the yoke and the yoke in turn is supported in operative position by a detachable saddle plate 15 secured to the draft sills.

The improved shock absorbing mechanism proper includes, broadly, front and rear follower acting casings A—A; a pair of side members B—B; front and rear wedge elements C—C; front and rear pairs of rockers D—D; front and rear spring follower plates E—E; and a main spring resistance F.

The front and rear follower casings A are of identical construction, each being of substantially hollow box-like form having a transverse end wall 17, top and bottom walls 18—18 and side walls 19—19. The end wall 17 of each casing is adapted to cooperate with the corresponding stop lugs in the manner of the usual follower. The inner ends of the casings A are spaced apart a predetermined distance in the normal release position of the parts as clearly shown in Figure 1. This distance corresponds to the compression stroke of the mechanism so that the casings will abut when the mechanism is fully compressed and the actuating force is transmitted directly through the casings to the corresponding stop lugs. Each casing is provided with interior, longitudinally disposed friction surfaces 20 at the opposite sides thereof. The side members B are also of like construction, each being in the form of a relatively heavy rectangular plate having longitudinally disposed exterior friction surfaces 120 adapted to cooperate with the corresponding friction surfaces 20 of the front and rear follower casings. Each side member is provided with a pair of wedge faces 21 on the inner side thereof, the wedge faces being disposed at opposite ends of the side member.

The front and rear wedge elements C are also of similar construction, each being in the form of a heavy, rectangular block having a central opening 22 therethrough adapted to freely accommodate the corresponding end of the spring resistance element F. Each block is provided with a pair of wedge faces 121 at the opposite sides thereof adapted to cooperate with the wedge faces 21 at the corresponding end of the side members E. At the outer side, each wedge block has a pair of curved bearing seats 23—23, the seats being disposed at opposite sides of the block.

The rockers D are four in number, arranged in pairs at opposite ends of the mechanism within the corresponding follower casings. The rockers of each pair are of like construction, but reversely arranged. Each rocker D has a curved outer bearing surface 24 adapted to cooperate with the inner surface of the transverse end wall 17 of the corresponding follower casing A; a curved, relatively short inner bearing surface 25 adapted to bear on the corresponding spring follower plate E; a curved fulcrum surface 123 at the outer end adapted to fulcrum in the corresponding bearing seat 23 of the adjacent wedge block C; and a curved bearing surface 26 at the inner side thereof, that is, the side nearest the longitudinal axis of the mechanism, adapted to cooperate with the corresponding bearing surface 26 of the adjacent rocker of the pair.

The main spring resistance F which consists of a relatively light inner coil and a relatively heavier outer coil is longitudinally disposed and has its opposite ends bearing on the front and rear follower plates E which are interposed between the spring and the corresponding pairs of rockers D. Each spring follower plate E is provided with a boss 27 on the inner side thereof adapted to extend within the central coil of the spring resistance to properly center the same.

The operation of the mechanism during a compression stroke is as follows: As the front and rear follower casings A are moved relatively toward each other, the side members B are forced outwardly against the friction surfaces of the follower casings by the wedge acting elements C, the pressure being transmitted to the latter from the corresponding followers through the medium of the interposed rockers D. As the follower casings A approach each other, the rockers are swung inwardly on their fulcrums, resisted by the main spring element F. It will be evident that during this action, the curved bearing surfaces 25 and 26 of each rocker will slide on the outer surface of the corresponding spring follower E and the inner surface of the end wall 17 of the corresponding follower casing A, respectively, thereby effecting a gradually accelerated inward movement of the spring followers with reference to the casings A. During this action of the rockers D, the effective leverage thereof will be gradually decreased, due to the gradually decreasing change of ratio of the effective lever arms of the rockers, the length of the lever arm of each rocker cooperating with the front follower gradually decreasing, while the length of the lever arm of the corresponding rocker which cooperates with the spring follower increases. The rockers thus act as toggle means in transmitting the actuating force from the front and rear follower casings to the respective wedge elements and spring followers. The described action will continue until the actuating force is reduced or the inner ends of the follower casings come into abutment, whereupon the pressure will be transmitted directly through the casings to the corresponding stop lugs as hereinbefore pointed out. During release, the main spring resistance will effectively return all of the parts to the normal position.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with front and rear follower acting members, each having a pair of longitudinally disposed friction surfaces; of longitudinally disposed friction elements each cooperating with the friction surfaces of the front and rear follower members; wedge means at the front and rear ends of the mechanism for forcing said elements against the friction surfaces of the followers; power multiplying pressure transmitting means engaging with said follower members and said wedge means; and a main spring resistance opposing inward movement of said pressure transmitting means.

2. In a friction shock absorbing mechanism, the combination with front and rear relatively movable follower casings, each casing having longitudinally disposed friction surfaces thereon; longitudinally disposed friction elements cooperating with the friction surfaces of the front and rear follower casings; wedge means at the opposite ends of the mechanism cooperating with said friction elements; a main spring resistance; front and rear rockers interposed between the front and rear spring follower casings and spring follower members, said rockers bearing on said wedge means at the opposite ends of the mechanism.

3. In a friction shock absorbing mechanism, the combination with front and rear follower casings having interior, longitudinally disposed friction surfaces; of friction elements cooperating with the friction surfaces of the front and rear followers; wedge means engaging the opposite ends of said elements; a pair of pressure transmitting elements fulcrumed on each wedge means and having bearing on the cooperating follower casing; and a main spring resistance interposed between the rockers at the opposite ends of the mechanism.

4. In a friction shock absorbing mechanism; the combination with front and rear relatively movable follower casings having opposed, interior, longitudinally disposed friction surfaces; of longitudinally disposed friction elements cooperating with the friction surfaces of the casings, said elements having wedge faces at the opposite ends thereof; a wedge member at each end of the mechanism having wedge faces cooperating with the corresponding wedge faces of said elements; a longitudinally disposed main spring resistance; spring follower acting means at opposite ends of the mechanism; and rockers at opposite ends of the mechanism bearing on the corresponding wedge member, follower casing and spring follower.

5. In a friction shock absorbing mechanism, the combination with front and rear follower casings having longitudinally disposed friction surfaces thereon; of friction elements cooperating with the friction surfaces of the front and rear casings; wedge means engaging the opposite ends of said elements; a main spring resistance; and toggle acting means for transmitting the actuating force from said follower casings to the wedge means and main spring resistance element.

6. In a friction shock absorbing mechanism, the combination with two end casings each provided with opposed interior friction surfaces; of a spring resistance; friction elements each adapted to coact with friction surfaces on both of said casings; and spreader means co-acting with the ends of said friction elements, said means including rockers.

In witness that I claim the foregoing I have hereunto subscribed my name this 11th day of February 1925.

GEORGE B. DOREY.